(No Model.)
W. A. RUDLING & J. F. COFFIN.
VELOCIPEDE.
No. 319,130. Patented June 2, 1885.
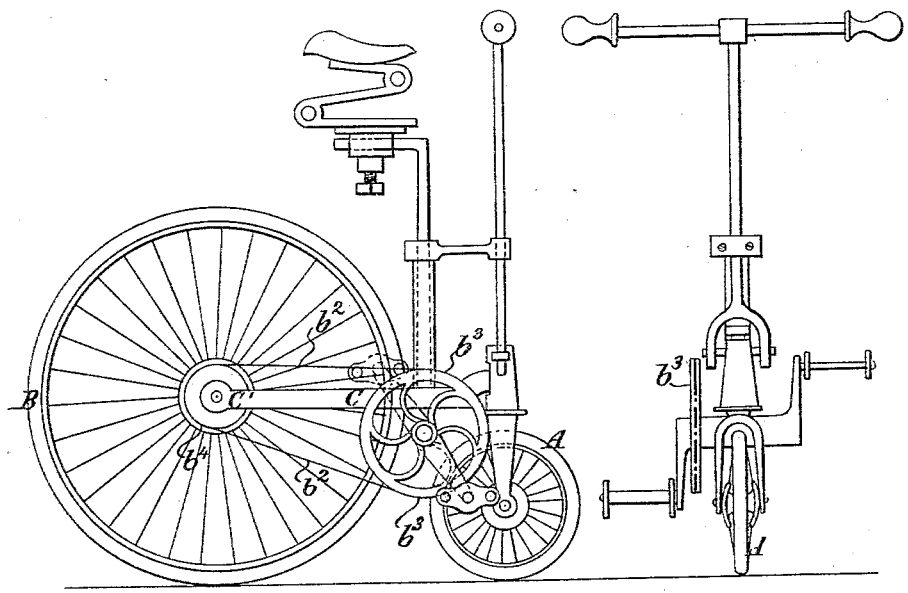

United States Patent Office.

WILLIAM ATKINS RUDLING AND JOHN FORD COFFIN, OF SOUTHSEA, COUNTY OF HANTS, ENGLAND.

VELOCIPEDE.

SPECIFICATION forming part of Letters Patent No. 319,130, dated June 2, 1885.

Application filed April 19, 1884. (No model.) Patented in England July 14, 1883, No. 3,482.

*To all whom it may concern:*

Be it known that we, WILLIAM A. RUDLING and JOHN F. COFFIN, subjects of the Queen of Great Britain, residing at Southsea, in the county of Hants, England, have invented a new and useful Improvement in Bicycles, (for which we have have received Letters Patent for Great Britain and Ireland, No. 3,482, dated July 14, 1883,) of which the following is a specification, reference being had to the accompanying drawings.

The objects of this invention are to reduce to a minimum the dangers of bicycle-riding by seating the rider so that when his feet are on the pedals they shall come to within about three inches of the ground; also, to obtain a very short, low, and extremely light machine, the cost of production of which may be less that that of ordinary bicycles; and that, secondly, by its shortness and lowness it shall require less room for storage, and be capable of moving in curves of smaller radius than bicycles in general use; and, thirdly, that, owing to its lightness, the balancing power of the rider may be easily attained, owing to the inconsiderable weight of the machine as compared with that of the rider—or, in other words, that the center of gravity of the mass (namely, man and machine) may in falling describe as large an arc as possible, so that the weight of the man shall predominate and command the machine, and not the machine control the man.

This improved bicycle differs from the bicycles in most common use in this: The hind wheel is the driving-wheel, to which motion is imparted by a sprocket or other power wheel and an endless chain or band or gearing, while the front wheel is the steering-wheel. The shaft of said power-wheel carries the cranks and pedals, being arranged between said driving and steering wheels. The size of the driving and steering wheels range from thirty inches downward, never requiring to be larger in diameter, but capable of being made smaller—the front wheel as small as ten inches in diameter. Both wheels may be of the same size, but never under any circumstances is the hind driving-wheel smaller than the front steering-wheel.

The invention essentially consists in novel combinations of parts, whereby the wheels of the bicycle are so arranged that the outer circumferences of the front and hind wheels overlap the circumference of the intermediate power-wheel.

Figure 1 is a side view, in elevation, of a bicycle constructed according to our invention. Fig. 2 is a front view, in elevation, of the same. Fig. 3 is a top view, in plan, of the same.

Similar letters of reference designate corresponding parts in all the figures.

A and B designate the carrying-wheels, and $b^3$ designates the intermediate power-wheel. The smaller carrying-wheel, A, which is in front, is the steering-wheel, and the larger wheel, B, which is behind, is the driving-wheel. The head-stock of the steering-wheel A is forked at its lower end to provide a bearing for the axle of the said wheel, and is so pivoted near its upper part to the horizontal backbone or main frame C that it may be turned to steer the bicycle by means of a convenient steering-handle, which extends upward far enough to be within reach of the rider. The backbone C is forked, as shown at C', and in its fork are the bearings for the axle of the hind-wheel, B. Both the carrying-wheels A B are brought as near together as possible, so that their outer circumferences overlap the circumference of the central intermediate power-wheel, $b^3$. This power-wheel works in bearings below and carried by the backbone, and to its shafts the pedals are attached by suitable cranks. The said wheel actuates the pulley $b^4$ on the axis of the hind wheel, B, by means of an endless chain or band, $b^2$.

The front wheel, A, being small, sufficient room is afforded between the power-wheel $b^3$ and the crank and pedal farthest from it for the lateral angular motion required for steering.

This bicycle is provided with a suitable seat for the rider. It may be driven by gearing the power-wheel and driving-wheel together by a set of cog-wheels, instead of the endless chain and band wheel before described.

What we claim as our invention, and desire to secure by Letters Patent, is—

The combination of the driving-wheel, the steering-wheel arranged in front thereof, and the intermediate power-wheel, the outer circumference of which is overlapped by the outer circumferences of the said driving and steering wheels, substantially as herein described.

WILLIAM ATKINS RUDLING.
JOHN FORD COFFIN.

Witnesses:
J. G. TONGUE,
34 *Southampton Buildings, London, W. C.*
HERBERT E. DALE,
17 *Gracechurch Street, London, E. C.*